United States Patent [19]

Beesley

[11] Patent Number: 4,771,342
[45] Date of Patent: Sep. 13, 1988

[54] METHOD AND APPARATUS FOR ENHANCING VIDEO-RECORDED IMAGES TO FILM GRADE QUALITY

[75] Inventor: Carl R. Beesley, Roanoke, Tex.

[73] Assignee: EMF Partners, Ltd., Dallas, Tex.

[21] Appl. No.: 105,976

[22] Filed: Oct. 6, 1987

Related U.S. Application Data

[63] Continuation of Ser. No. 729,462, May 1, 1985, abandoned.

[51] Int. Cl.[4] .......................... H04N 5/76; H04N 5/202
[52] U.S. Cl. ...................................... 358/335; 358/22; 358/164
[58] Field of Search ............ 358/310, 335, 346, 244.1, 358/164, 22, 75, 78

[56] References Cited

U.S. PATENT DOCUMENTS

| | | | |
|---|---|---|---|
| 4,240,112 | 12/1980 | Inaba et al. | 358/22 |
| 4,468,693 | 8/1984 | Fujita et al. | 358/78 |
| 4,473,849 | 9/1984 | Cool | 358/332 |

*Primary Examiner*—Donald McElheny, Jr.
*Attorney, Agent, or Firm*—Harold E. Meier

[57] ABSTRACT

A method and apparatus for enhancing video-recorded images to emulate images generated by emulsion film recording is described. According to the preferred embodiment, a video signal comprising the video-recorded images is first applied to a frame synchronizer, which processes the video signal to emulate the frame rate normally associated with film display. The output from the frame synchronizer is then applied to a color corrector, which provides gamma correction to the video signal using a gray scale normally associated with emulsion film recording. The color corrector also advantageously adjusts the contrast ratio of the video signal to emulate the contrast ratio of the emulsion film recording process. This is accomplished by lowering the black level "set-up" point on the gray scale normally associated with a video recording process, and boosting the gain of the video signal to compensate for the lowered contrast scale. The output of the color corrector is then applied to a processing amplifier, which also receives the output of a random noise generator. The processing amplifier uniformly introduces noise into each frame of the video signal to simulate the texture of emulsion film. Although originally produced by video recording techniques, the output of the processing amplifier has the "look" of program material originally recorded on emulsion film.

6 Claims, 1 Drawing Sheet

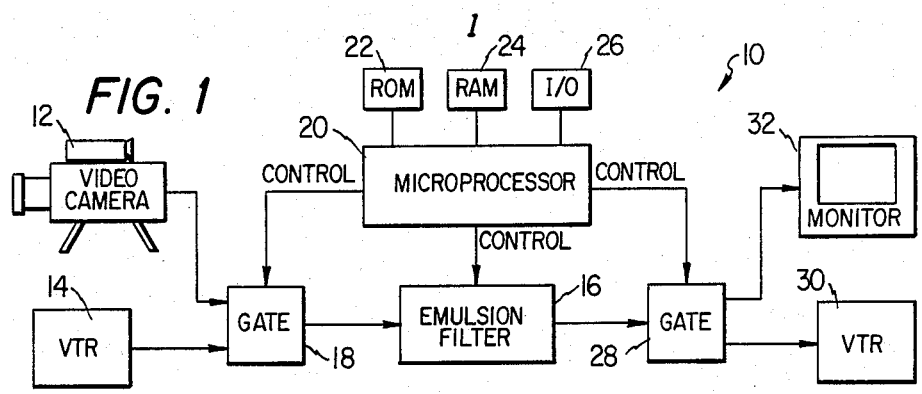
FIG. 1
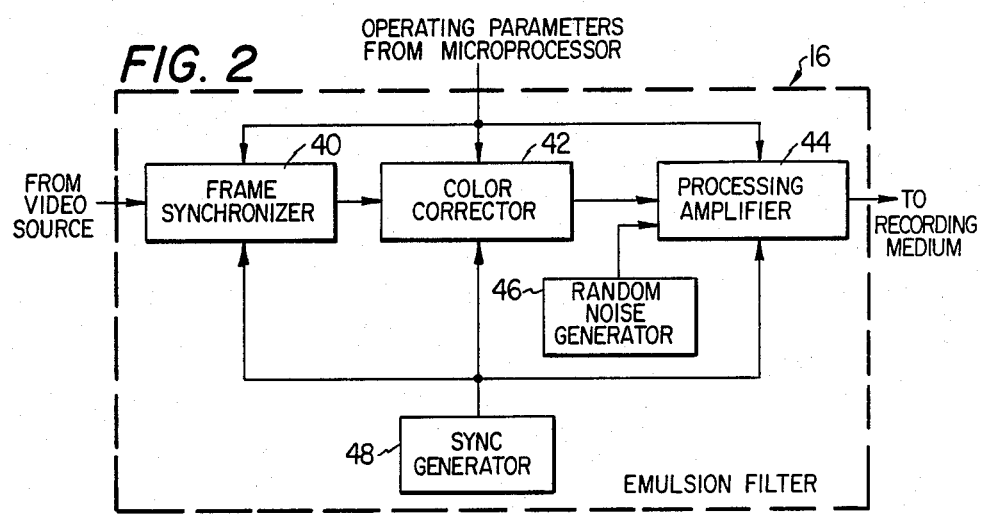
FIG. 2
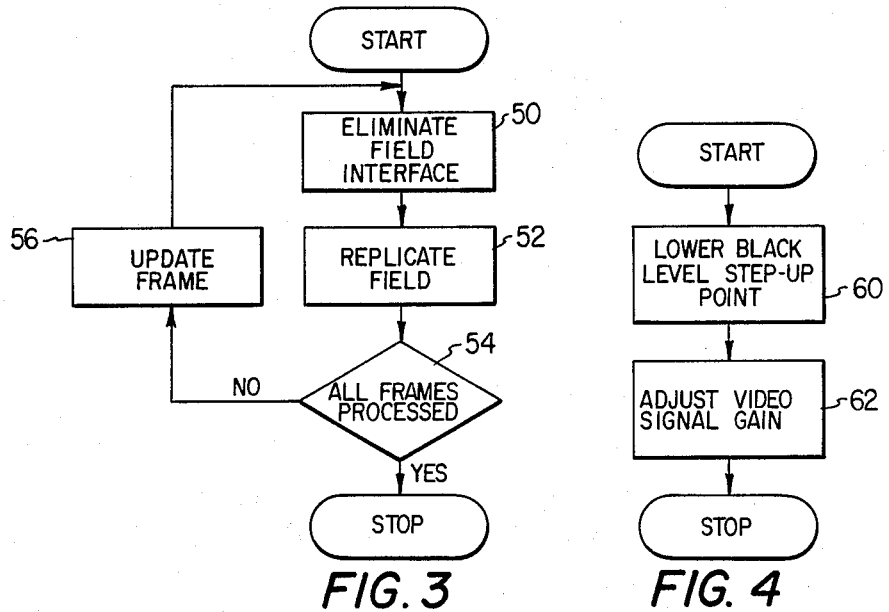
FIG. 3
FIG. 4

METHOD AND APPARATUS FOR ENHANCING VIDEO-RECORDED IMAGES TO FILM GRADE QUALITY

TECHNICAL FIELD

The present invention relates to video signal processing and more particularly to a method and apparatus for enhancing a video signal generated by a video camera and/or recorded on videotape to emulsion film grade quality.

BACKGROUND OF THE INVENTION

It is well known that program material originally generated by a video camera and recorded on videotape produces a television picture aesthetically less pleasing than program material originally produced on film and then transferred to videotape. The difference in the "look" of film as compared to video is due to fundamental differences in the manner in which the basic images are recorded, as well as the differing physical characteristics of the two recording mediums. Video recording, however, has certain economic and practical advantages as compared to film recording. For example, because recorded video images can be immediately monitored and played-back, it is considerably less expensive to shoot and edit program material on video rather than film, which requires expensive and time consuming development and post-production processes.

It would therefore be desirable to provide a method and apparatus for generating program material which retains the practical benefits of video recording, but at the same time produces an output which has the "look" of program material originally recorded on film.

BRIEF SUMMARY OF THE INVENTION

The present invention relates to a method and apparatus for enhancing video-recorded images to emulate images recorded by an emulsion film recording process. According to the preferred embodiment, a video signal comprising the video-recorded images is first applied to a frame synchronizer, which processes the video signal to emulate the frame rate normally associated with film display. The output from the frame synchronizer is then applied to a color corrector, which provides gamma correction to the video signal using a gray scale relationship normally associated with emulsion film. The color corrector also advantageously adjusts the contrast ratio of the video signal to emulate the contrast ratio associated with emulsion film recording. This is accomplished by lowering the black level "set-up" point on the gray scale normally associated with a video recording process, and boosting the gain of the video signal. The output of the color corrector is then applied to a processing amplifier, which also receives a random noise signal output from a random noise generator. The processing amplifier uniformly introduces the random noise signal into each frame of the video signal to simulate the texture of emulsion film. If needed, the processing amplifier may also adjust or readjust the contrast ratio of the processed video signal, which is then output to a suitable storage device or broadcast "live." Although originally generated by video-recording techniques, the processed video signal has the "look" of program material originally recorded on emulsion film.

BRIEF DESCRIPTION OF THE DRAWINGS

For a more complete understanding of the present invention and the advantages thereof, reference is now made to the following Description taken in conjunction with the accompanying Drawings in which:

FIG. 1 is a block diagram of a preferred system configuration of the present invention for enhancing video-recorded images to emulsion film grade quality;

FIG. 2 is a schematic block diagram of the filter of FIG. 1 for generating the enhanced video-recorded images;

FIG. 3 is a flowchart representation of a frame rate variation process used in the method of the present invention; and FIG. 4 is a flowchart representation of a contrast ratio adjust process used in the method of the present invention.

DETAILED DESCRIPTION

Referring now to the Figures wherein like reference characters designate like or similar elements throughout the several views, FIG. 1 is a block diagram of a preferred system 10 for enhancing video-recorded images according to the present invention. The system 10 includes a plurality of input devices typically associated with video recording, for example, video camera 12 and videocassette tape recorder (VTR) 14. Either of these devices can be used to provide a conventional NTSC video signal to a filter 16, which as will be described below serves to enhance this signal to make it "look" as if originally recorded by an emulsion film recording process.

The video signal provided by video camera 12, VTR 14 or any other suitable input device is gated to the emulsion filter 16 by gate 18 under the control of a general purpose microprocessor 20. Microprocessor 20 has conventional storage devices associated therewith, including a read only memory (ROM) 22 for permanently storing application programs used to control the operation of the system, and a random access memory (RAM) 24 for temporary storage of programs being run by the microprocessor 20. RAM 24 also provides an intermediate storage area for data calculations. Microprocessor 20 also includes associated input/output (I/O) devices 26 such as a keyboard, display and printer. Under the control of a conventional display prompting scheme, an operator enters data and instructions via the keyboard to control various processing functions. For example, if the operator desires to process a video signal from the video camera 12, data identifying the video camera is entered via the keyboard and processed by an I/O routine in the microprocessor 20. This processing generates a signal to control gate 18, which then operates to pass the video signal from the video camera 12 to the filter 16.

As will be described below, microprocessor 20 also serves to adjust various operating parameters of the filter 16 in accordance with data input to the system by the operator via the I/O interface 26. Video signals processed by the filter 16 are then output to a gate 28, which is also controlled by the microprocessor via operator-selected data input via the I/O interface 26. These video signals are then provided to a suitable storage device such as VTR 30, displayed on a conventional monitor 32, or broadcast "live." Operation of the filter 16 serves to enhance the video-recorded images to produce an output signal which when broadcast or reviewed, appears as if it was originally recorded by an emulsion film process.

Although not shown in detail in FIG. 1, it should be appreciated that the system 10 may include other associated monitoring and testing devices, including video monitors, testing oscilloscopes, audio amplifiers and speakers, and other such support devices. Moreover, although a video camera 12 and VTR 14 are shown as the source of the video signal, any other suitable video signal source may be processed by the system 10.

Referring now to FIG. 2, a schematic block diagram of the filter 16 of FIG. 1 for generating the enhanced video-recorded images is shown in detail. Filter 16 includes three primary processing devices, frame synchronizer 40, color corrector 42 and processing amplifier 44. A random noise generator 46 is also provided for generating a noise signal to be injected into the video signal being processed, as described below. Operating parameters for the frame synchronizer 40, color corrector 42 and processing amplifier 44 are controlled via operator-selected data input via the I/O interface 26 and processed by microprocessor 20 of FIG. 1. Overall timing synchronization for the filter 16 is provided by clock signals generated by the sync generator 48.

As is well-known in the art, video-recorded images are normally displayed at thirty (30) frames/second, with each frame divided into two equal parts or fields. Two fields must be produced in order to make one complete frame, and thus a field frequency of sixty (60) fields/second is used with a frame frequency of thirty (30) frames/second. Each field thus contains one-half of the total frame image. To the contrary, in film recording, each frame is normally displayed at twenty-four (24) frames/second.

Referring back to FIG. 2, the video signal provided from a selected video source is input to the frame synchronizer 40, which processes this signal to emulate the frame rate associated with the typical display rate of film. Thus, the output of the frame synchronizer 40 is a video signal which has a perceived frame rate of (24) frames/second. This operation is provided by the frame synchronizer 40, under the control of the microprocessor 20 of FIG. 1, through use of a frame rate variation process shown in the flowchart of FIG. 3.

Referring now briefly to FIG. 3, the frame rate variation process begins by eliminating the field interlace in step 50, which effectively removes one of the two fields in each video frame. In step 52, the remaining field of each frame is then frozen for a predetermined time period, i.e., 1/30 of a second, which serves to replicate the information in the freezed field. In step 54, a test is made to determine if all frames have been processed. If yes, the routine terminates; if no, the frame synchronizer 40 of FIG. 2 is then updated with new frame information in step 56. The frame rate variation process shown in FIG. 3 results in a "strobe effect" similar to a twenty-four (24) frame/second rate associated with film display.

In the preferred embodiment of the invention, the frame synchronizer 40 also advantageously includes a comb filter which effectively "softens" the picture by vertically and horizontally averaging field information. Vertical de-emphasis is also provided by the frame synchronizer 40 because one-half of the vertical resolution is dropped by operation of the frame rate variation process of FIG. 3.

Referring back to FIG. 2, the output of the frame synchronizer 40 is then provided to the color corrector 42, which operates generally to provide gamma correction to the video signal using a gray scale relationship associated with emulsion film recording. The color corrector 42 is controlled, by operator-selected data input to the microprocessor 20, to change the "knee" of the gray scale normally associated with video-recording such that this scale more approximates that obtained from emulsion film recording. As is well-known in the art, gamma is defined as a numerical indication of the degree of contrast in an image. Gamma correction of a video signal is necessary to ensure that a transmitted signal will be properly produced by the non-linear elements of a conventional television receiver. The color corrector 42 of the present invention provides gamma correction to the video signal provided by the frame synchronizer 40 using the gray scale relationship normally associated with emulsion film recording.

Color corrector 42 also advantageously adjusts the contrast ratio of the video signal as more particularly described in a contrast ratio adjust process shown in the flowchart representation of FIG. 4. As discussed above with respect to FIG. 3, operating parameters associated with this step are controlled by the microprocessor 20 of FIG. 1.

With reference now to FIG. 4, the contrast ratio adjust process begins in step 60, where the black level "set-up" point is lowered such that the video signal is forced into black earlier on the gray scale than is the case with a conventional unprocessed video signal. Under conventional NTSC standards, the black level "set-up" point is normally "7.5" on a scale of "0" to "100" IRE units. Because the contrast scale has been shifted downward, the contrast ratio adjust process requires a gain adjustment in step 62 to compensate for the lowered picture contrast.

Referring back to FIG. 2, the output of the color corrector 42 is provided to the processing amplifier 44, which also receives the random noise signal generated by random noise generator 46. In operation, amplifier 44 uniformly introduces the random noise into each frame of the video signal to closely simulate the appearance of emulsion film recording. Preferably, the random noise generator 46 also includes a variable potentiometer (not shown) associated therewith for varying, under the control of the microprocessor 20, the amount of simulated "grain" injected into the video signal. If needed, the processing amplifier 44 also may be used to adjust or readjust the contrast ratio of the video signal by enabling black level supression and "white stretch" into soft clip boundaries. As discussed above with respect to the color corrector 42, this type of processing is characteristic of emulsion photocontamination, and further serves to enhance the film "look" of the process.

The output of the processing amplifier 44 is then provided to a suitable storage device or broadcast "live" as discussed above with respect to FIG. 1. This video signal has the "look" of program material originally recorded on emulsion film. Because the video signal is originally produced by video recording techniques, however, the overall system provides the practical and economic benefits of video recording.

In the preferred embodiment of the invention, the frame synchronizer 40 of FIG. 2 is implemented by an Apert-Hertzog Model H2 synchronizer, specially adapted for field rate processing by the field rate variation process of FIG. 3. The color corrector 42 is preferably implemented by a Thomson 5700 Color Corrector device, and the processing amplifier 44 is implemented by a Lenco 365 Processing Amplifier.

Although the invention has been described in detail, it is to be clearly understood that the same is by way of illustration and example only and is not to be taken by way of limitation, the spirit and scope of the invention being limited only to the terms of the appended claims.

What is claimed is:

1. Apparatus for enhancing to emulsion film grade quality a video signal having a frame rate, gray scale and contrast ratio and representing video-recorded images from a video source, comprising:
   means for varying the frame rate of the video signal received from the video source to emulate the frame rate of images recorded on emulsion film;
   means for gamma correcting the video signal received from the video source using a gray scale relationship associated with an emulsion film recording;
   means for adjusting the contrast ratio of the video signal received from the video source to emulate the contrast ratio associated with emulsion film recording; and
   means for connecting the enhanced video signal to a storage device or real time display.

2. The apparatus for enhancing a video signal as described in claim 1 wherein the means for varying the frame rate includes:
   means for deleting a field from each frame of the video signal; and
   means for freezing a remaining field in each frame for a predetermined time period.

3. The apparatus for enhancing a video signal as described in claim 1 wherein the means for gamma correction shifts the "knee" of the gray scale relationship associated with a video recording process to emulate the gray scale relationship associated with an emulsion film recording.

4. The apparatus for enhancing a video signal as described in claim 1 wherein the means for adjusting the contrast ratio of the signal includes:
   means for lowering a black level "set-up" point of the gray scale relationship associated with a video recording process; and
   means for boosting the gain of the video signal to compensate for the lowered black level "set-up" point of the scale.

5. Apparatus for enhancing to emulsion film grade quality a video signal having a frame rate, gray scale and contrast ratio and representing video-recorded images from a video source, comprising:
   means for varying the frame rate of the video signal received from the video source to emulate the frame rate of images recorded on emulsion film;
   means for gamma correcting the video signal received from the video source using a gray scale relationship associated with an emulsion film recording;
   means for lowering the black level "set-up" point of a gray scale relationship associated with a video recording process;
   means for boosting the gain of the video signal to compensate for the lowered black level "set-up" point of a gray scale;
   means for introducing random noise into the video signal to simulate the texture of emulsion film; and
   means for connecting the enhanced video signal to a storage device or real time display.

6. Apparatus for enhancing to emulsion film grade quality a video signal having a frame rate, gray scale and contrast ratio and representing video-recorded images from a video source, comprising:
   means for varying the frame rate of the video signal received from the video source to a frame rate of images recorded on emulsion film;
   means for gamma correcting the video signal interconnected to the means for varying and using a gray scale relationship associated with an emulsion film recording;
   means for adjusting the contrast ratio of the video signal interconnected to the means for gamma correcting to emulate the contrast ratio relationship associated with emulsion film recording;
   means for generating a random noise signal;
   means connected to the means for generating a random noise and the means for adjusting for introducing the random noise signal into each frame of the video signal to provide an enhanced video signal simulating the texture of emulsion film; and
   means for connecting the enhanced video signal to a storage device or real time display.

* * * * *